United States Patent
Yoshii

(10) Patent No.: US 8,194,217 B2
(45) Date of Patent: Jun. 5, 2012

(54) ELECTRO-OPTICAL APPARATUS AND ELECTRONIC DEVICE HAVING PARTICULAR PIXEL CONFIGURATION

(75) Inventor: Masahito Yoshii, Fujimi-cho (JP)

(73) Assignee: Seiko Epson Corporation, Tokyo (JP)

( * ) Notice: Subject to any disclaimer, the term of this patent is extended or adjusted under 35 U.S.C. 154(b) by 517 days.

(21) Appl. No.: 12/539,648

(22) Filed: Aug. 12, 2009

(65) Prior Publication Data

US 2010/0079691 A1 Apr. 1, 2010

(30) Foreign Application Priority Data

Sep. 26, 2008 (JP) ................................ 2008-247496

(51) Int. Cl.
*G02F 1/1343* (2006.01)
*G02F 1/1335* (2006.01)
*G02F 1/1345* (2006.01)

(52) U.S. Cl. .............. 349/139; 349/5; 349/39; 349/149; 349/151; 349/152

(58) Field of Classification Search .................. 349/139, 349/5, 39, 149, 151, 152
See application file for complete search history.

(56) References Cited

U.S. PATENT DOCUMENTS

| 6,388,723 B1 | 5/2002 | Iida et al. |
| 6,744,484 B1 * | 6/2004 | Yoshino et al. ............... 349/153 |
| 7,196,353 B2 * | 3/2007 | Murade ........................... 257/59 |

FOREIGN PATENT DOCUMENTS

| JP | 3475421 B | 4/1998 |
| JP | 2005-77636 A | 3/2005 |
| JP | 2008-89773 A | 4/2008 |

* cited by examiner

*Primary Examiner* — Mike Qi
(74) *Attorney, Agent, or Firm* — AdvantEdge Law Group, LLC

(57) ABSTRACT

An electro-optical apparatus includes a pixel section, a dummy pixel section and a peripheral electrode. The peripheral electrode configured to be formed in an area surrounding the dummy pixel section. A voltage supplying section configured to supply the peripheral electrode and an opposing electrode with voltages of substantially the same level, respectively.

10 Claims, 9 Drawing Sheets

ELECTRO-OPTICAL APPARATUS AND ELECTRONIC DEVICE HAVING PARTICULAR PIXEL CONFIGURATION

BACKGROUND

1. Technical Field

The present invention relates to an electro-optical device, such as a liquid crystal apparatus, and an electronic device including the electro-optical apparatus, such as a liquid crystal projector.

2. Field of Invention

As this kind of electro-optical apparatuses, for example, there are apparatuses each including a TFT array substrate and an opposing substrate therein which have a liquid crystal layer interposed therebetween, which is an electro-optical material. On the TFT array substrate, a plurality of pixel electrodes arranged in a matrix are provided in a planar area, which is handled as an image displaying area. However, among the plurality of pixel electrodes arranged in a planar area, it is difficult for pixel electrodes allocated at left, right, top and bottom edges or in areas located around the edges to perform operations as satisfactorily as pixel electrodes allocated around a central portion. Therefore, there are cases in which the pixel electrodes allocated around the edges, among the plurality of pixel electrodes, are made to be dummy pixel electrodes which do not contribute to displaying images (refer to JP-A-2005-77636).

Further, in a different respect, it is known to those skilled in the art that occurrence of an electric field having not related to displaying images in a peripheral circuit portion located in an area surrounding the image displaying area leads to deterioration of liquid crystal and the like. In order to suppress such an occurrence of an electric field, a technology has been proposed in which voltage levels of metallic light-shielding layers are made equal to those of opposing electrodes and storage capacitors (refer to Japanese Patent No. 3475421).

SUMMARY

Although the above-described dummy pixel electrodes do not contribute to displaying images, typically, they are driven in the same manner as or in a manner similar to that for the pixel electrodes. However, as described above, supplying the dummy pixel electrodes with a voltage of substantially the same level as that of a voltage supplied to the pixel electrodes is likely to lead to deterioration of a liquid crystal layer due to occurrence of direct currents. That is, in the technology which suggests provision of dummy pixel electrodes, occurrence of electric fields unnecessary to display images leads to a technical disadvantage in that reliability of the electro-optical apparatus is reduced.

An advantage of aspects of the invention is to provide an electro-optical apparatus and an electronic device of high reliability.

An electro-optical apparatus according to an aspect of the invention includes a substrate and an opposing substrate which have an electro-optical material interposed therebetween, and the electro-optical apparatus includes pixel sections each configured to be formed in a pixel area on the substrate and include a pixel electrode and a transistor corresponding to the pixel electrode; dummy pixel sections each configured to be formed in an area surrounding the pixel area and include a dummy pixel electrode and a dummy transistor corresponding to the dummy pixel electrode; peripheral electrodes configured to be formed in an area surrounding the dummy pixel sections and be at least partially connected electrically to the dummy pixel electrodes; opposing electrodes configured to be opposite the pixel electrodes, respectively; and a voltage supplying section configured to supply the opposing electrodes and the peripheral electrodes with voltages of substantially the same level, respectively.

The electro-optical apparatus according to the aspect of the invention includes a substrate having various kinds of wiring lines, such as data lines and scanning lines, and electrodes formed therein, and further, an opposing substrate allocated so as to be opposite this substrate, the substrate and the opposing substrate having an electro-optical material, such as liquid crystal, interposed therebetween, and applying a voltage between the two substrates and thereby performing control of the electro-optical material enable realization of displaying images.

In a pixel area (i.e., an area configured to display images) on the substrate, pixel sections, each corresponding to one of pixels and including an pixel electrode and a transistor configured to perform control of supplying the pixel electrode with image signals, are provided. In each of the pixel sections, for example, the transistor is supplied with a scanning signal from one of the scanning signal lines, and thereby, supplying the pixel electrode with image signals from one of the data lines is controlled. In this manner, displaying images employing a so-called active matrix scheme is performed.

In a dummy pixel area configured to at least partially occupy an area surrounding the pixel area on the substrate, dummy pixel sections, each corresponding to one of dummy pixels configured to simulate the pixels in the pixel area and including a dummy pixel electrode and a dummy transistor, are provided. The dummy pixel area is an area not contributing to displaying images, which includes, for example, portions where positions from which operations of writing image signals or the like into the data lines or the like commence are located and the voltage levels of such lines are unlikely to be stable, and also, portions where pieces of swarf, which are generated by performing rubbing processes with respect to alignment films during manufacturing, are hard to be removed and are likely to remain. Therefore, forming the dummy pixel sections in the dummy pixel area which include the above-described portions enables displaying of images more stably.

The dummy pixel sections are configured so as not to perform control of the electro-optical material such as liquid crystal, or so as to perform control different from control performed by the pixel sections (for example, black displaying). Alternatively, the dummy pixel sections are configured so as to be driven in the same manner as or in a manner similar to the pixel sections, but be handled as light-shielding areas so as not to contribute to displaying images. In addition, each of the dummy pixel sections is caused to be of a configuration approximately the same as that of one of the pixel sections, but may be of a configuration partially different from that of one of the pixel sections. That is, as far as the above-described effect in that displaying images is performed more stably by driving the dummy pixel sections in the same manner as or in a manner similar to the pixel sections can be obtained, each of the dummy pixel sections may be of a configuration different from that of one of the pixel sections to a certain degree.

In a peripheral area configured to at least partially occupy an area surrounding the dummy pixel area on the substrate, peripheral electrodes are provided. The peripheral electrodes are electrodes which are formed at the same layer as, for example, the pixel electrodes in the pixel sections and dummy pixel electrodes in the dummy pixel sections, and are allocated so as to be opposite the electro-optical material, which is interposed between the pair of substrates, via an alignment film or the like.

Here, particularly, the peripheral electrodes are at least partially electrically connected to the dummy electrodes. In addition, this "partially" suggests that at least one part of the peripheral electrodes is electrically connected to one part of the dummy pixel electrodes. That is, when broadly interpreted, in the case where the peripheral electrode and the dummy pixel electrode are in plurality, respectively, a condition in which one peripheral electrode and one dummy pixel electrode are electrically connected to each other is included. However, typically, all of the peripheral electrodes and all of the dummy electrodes are electrically connected. That is, voltage levels of all of the peripheral electrodes and voltage levels of all of the dummy electrodes are configured so as to be the same.

The peripheral electrodes are supplied with a voltage by a voltage supplying section. In this manner, the dummy pixel electrodes electrically connected to the peripheral electrodes are also supplied with the voltage from the voltage supplying section. The voltage supplying section supplies opposing electrodes provided on the opposing substrate with a voltage of a level the same as that of a voltage supplied to the peripheral electrodes. Therefore, the voltage levels of the opposing electrodes are the same as those of the peripheral electrodes and those of the dummy pixel electrodes. In addition, here, "the same" does not require exactly the same values, but suggests that the values are so close to one another that they can be regarded as substantially the same. In other words, by making the voltage levels of the peripheral electrodes to be close to those of the opposing electrodes (i.e., by making the voltage levels of the opposing electrodes to be close to those of the peripheral electrodes and those of the dummy pixel electrodes), advantages led by the aspect of the invention, which will be described below, can be properly achieved.

Making the voltage levels of the opposing electrodes to be the same as those of the peripheral electrodes and those of the dummy pixel electrodes, as a result, enables prevention of occurrence of direct currents flowing between the opposing electrodes and the dummy pixel electrodes. The occurrence of direct currents flowing between the opposing electrodes and the dummy pixel electrodes leads to deterioration of the electro-optical material existing between the opposing electrodes and the dummy pixel electrodes, and thus, is likely to cause errors and defects in displaying images. Therefore, according to the aspect of the invention, a configuration which causes voltage supplying lines to supply the opposing electrodes and the peripheral electrodes with voltages of the same level, respectively, enables increase of reliability of the apparatus.

In addition, typically, in positions closer to the pixel area, the above-described advantages are more significantly brought out. Thus, in order to cause the plurality of dummy pixel electrodes to be partially supplied with voltages of the same level as those of the opposing electrodes, it is desirable to cause the dummy pixel electrodes located closer to the pixel area to be supplied with voltages of the same level as that of voltages of the opposing electrodes.

As described above, in the electro-optical apparatus according to the aspect of the invention, it is possible to prevent occurrence of direct currents flowing between the opposing electrodes and the dummy pixel electrodes. Accordingly, it is possible to significantly effectively increase reliability of the apparatus.

In the electro-optical apparatus according to the aspect of the invention, preferably, the dummy electrode is electrically connected to another dummy electrode arranged adjacent thereto.

In this case, since the dummy electrode is electrically connected to another dummy electrode arranged adjacent thereto, provided that one dummy pixel electrode is electrically connected to one of the peripheral electrodes, other dummy pixel electrodes electrically connected to the one dummy pixel electrode are supplied with the voltage supplied to the peripheral electrode. Therefore, it is possible to reduce the number of electrical connections between the peripheral electrodes and the dummy pixel electrodes. Further, it is possible to cause the voltage level of each of the dummy pixel electrodes to be mutually equalized. Thus, it is possible to appropriately prevent occurrence of direct currents flowing between the opposing electrodes and the dummy pixel electrodes.

In addition, the dummy pixel electrodes electrically connected to one another may be a part of the dummy pixel electrodes. That is, even in the case where all of the dummy pixel electrodes are not electrically connected to one another, it is possible to properly achieve the above-described advantages.

In the electro-optical apparatus according to the aspect of the invention, preferably, the dummy electrode is formed so as not to be electrically connected to the dummy transistor.

In this case, since the dummy electrode is formed so as not to be electrically connected to the dummy transistor, it is possible to prevent a voltage which is supplied to the dummy pixel electrode from the voltage supplying line via the peripheral electrode from being supplied to the dummy transistor. Furthermore, it is possible to prevent the voltage of the dummy electrode and the voltage of the opposing electrode from not being of the same level due to a condition resulting from driving the dummy transistor in which image signals supplied from one of the data lines or the like are supplied to the dummy electrode. Thus, it is possible to more certainly prevent occurrence of direct currents flowing between the opposing electrodes and the dummy electrodes.

In the electro-optical apparatus according to the aspect of the invention, preferably, patterning of the peripheral electrode is performed in a shape the same as that of at least one of the pixel electrode and the dummy pixel electrode.

In this case, since patterning of the peripheral electrodes is performed in a shape the same as that of at least one of the pixel electrode and the dummy pixel electrode, it is possible to easily form the peripheral electrode. That is, since the peripheral electrode can be formed by using a process similar to a process used for forming the pixel electrode and the dummy pixel electrode, it is possible to prevent increase of the number of processes and cost in manufacturing thereof.

In such a case in which patterning of the peripheral electrode is performed, preferably, the peripheral electrode is electrically connected to another peripheral electrode arranged adjacent thereto.

Since such a configuration allows the peripheral electrode to be electrically connected to another peripheral electrode arranged adjacent thereto, once the voltage supplying line is electrically connected to one of the patterned peripheral electrodes, as a result, other peripheral electrodes electrically connected to the peripheral electrode are supplied with the voltage supplied from the voltage supplying line. Therefore, it is not necessary to cause the voltage supplying line to be connected to all of the patterned peripheral electrodes. Thus, it is possible to effectively prevent increase of complexity of a configuration of the apparatus.

The electro-optical apparatus according to the aspect of the invention further includes a relay layer having an island shape which forms an electric connection between the pixel electrode and the transistor; and a capacitance line configured to be formed at a layer the same as that at which the relay layer is formed, and be formed so as to at least partially enclose the relay layer via an aperture occupying an area surrounding the relay layer.

In this case, a pixel electrode and a transistor located in each of the pixel sections are electrically connected to each other via a relay layer having an island shape. For example, the relay layer is formed as a layer located between a layer where the pixel electrode is formed and a layer where the transistor is formed, and is electrically connected to the pixel electrode and the transistor via contact holes, respectively. Such a configuration allows the pixel electrode and the transistor to be electrically connected to each other.

At the same layer as the relay layer, a capacitance line is formed so as to at least partially enclose the relay layer via an aperture occupying an area surrounding the relay layer. That is, the capacitance line is formed at the same layer as the relay layer, but is formed so as not to be electrically connected to the relay layer by allocating the aperture between the relay layer and itself. In addition, here, "the same layer" means a layer formed through the same film formation process, and the thicknesses and locations of the layers may be different to each other. The capacitance line is, for example, electrically connected to a capacitor electrode, or a portion of the capacitance line functions as a capacitor electrode, and thereby, a storage capacitor is formed.

Providing the above-described relay layer and the capacitance line enables certainly forming a connection between the pixel electrode and the transistor, as well as forming the storage capacitor, and as a result, it is possible to display images of high quality. In addition, typically, the relay layers and the capacitance lines are provided in both the pixel area and the dummy pixel area. Additionally, in the pixel area, it is desirable to form the relay layer and the capacitance line so as not to narrow the aperture area (i.e., so as not to reduce the aperture ratio)

In such a case as described above in which the relay layer and the capacitance line are further included, preferably, the electro-optical apparatus according to the aspect of the invention further includes a light-shielding layer configured to be formed at a layer located lower than that at which the relay layer and the capacitance line are formed, and be formed so as to at least partially cover the aperture in plan view from above the substrate.

Such a configuration as described above allows the light-shielding layer to shield light rays propagating towards the aperture existing between the relay layer and the capacitance line. Owing to this configuration, it is possible for the light-shielding layer to prevent incident light rays from being transmitted through the dummy pixel area, which is defined as a light-shielding area (i.e., an area configured to shield light rays from being transmitted through, so as to cause the light rays not to contribute to displaying images). Therefore, it is possible to prevent occurrence of defects in displaying images, resulting from permitting light rays, which are not to be transmitted through the apparatus, to be transmitted through.

Furthermore, in the pixel area, it is possible to prevent occurrence of leakage currents resulting from incident light rays into the transistor and the like via the aperture. Additionally, within the pixel area, in the same manner as or in a manner similar to the above-described capacitance line, it is desirable to form the light-shielding layer so as not to narrow the aperture areas.

In such a case as described above in which the light-shielding layer is further included, preferably, the light-shielding layer is electrically connected to the capacitance line.

Such a configuration allows the light-shielding layer and the capacitance line to be mutually connected electrically, and thus, causes the light-shielding layer to function as the capacitance line. Therefore, it is possible to appropriately form the storage capacitor. Thus, it is possible to display images of high quality. In addition, the light-shielding layer to be electrically connected to the capacitance line may be partial. That is, all of the light-shielding layers are not necessary to be electrically connected to the capacitance lines, and one light-shielding layer functioning as one of the capacitance lines may be mixed with the other light-shielding layers not being electrically connected to the one light-shielding layer.

In such a case as described above in which the relay layer and the capacitance line are further included, preferably, the electro-optical apparatus according to the aspect of the invention further includes a voltage relay layer configured to be formed at a layer the same as that at which the relay layer and the capacitance line are formed, and the voltage supplying section supplies the peripheral electrode with a voltage via the voltage relay layer.

Such a configuration allows the peripheral electrode to be certainly supplied with the voltage supplied from the voltage supplying section. Therefore, it is possible to make the voltage of the dummy pixel electrode, which is electrically connected to the peripheral electrode, to be of the same level as that of the opposing electrode. The voltage relay layer is formed, for example, at a layer located lower than the peripheral electrode via an inter-layer insulating film or the like, and is electrically connected to the peripheral electrode via a contact hole. The voltage relay layer is provided at the same layer as the above-described relay layer and the capacitance line, and thus, can be relatively easily formed.

An electronic device according to another aspect of the invention includes the above-described electro-optical apparatus according to the aspect of the invention.

The electronic device according to an aspect of the invention includes the electro-optical apparatus according to the invention, and thus, enables realization of various kinds of electronic devices of high reliability, such as a projection type display device, a television set, a mobile phone, an electronic notebook, a word processor, a view finder type or monitor direct view type video tape recorder, a work station, a TV telephone, a POS terminal and a touch panel. Further, as one of the electronic devices according to the aspect of the invention, it is also possible to realize an electrophoretic device, such as electronic paper.

Operations and other advantages of the aspects of the invention will be made apparent from exemplary embodiments of the invention which will be described below.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments according to the invention will be described with reference to drawings.
Electro-Optical Apparatus An electro-optical apparatus according to an embodiment will be hereinafter described with reference to FIGS. 1 to 10. In addition, a liquid crystal apparatus of a driving-circuit built-in type, employing the TFT active matrix driving scheme, will be hereinafter described as an example of the electro-optical apparatus.

Figure 1:
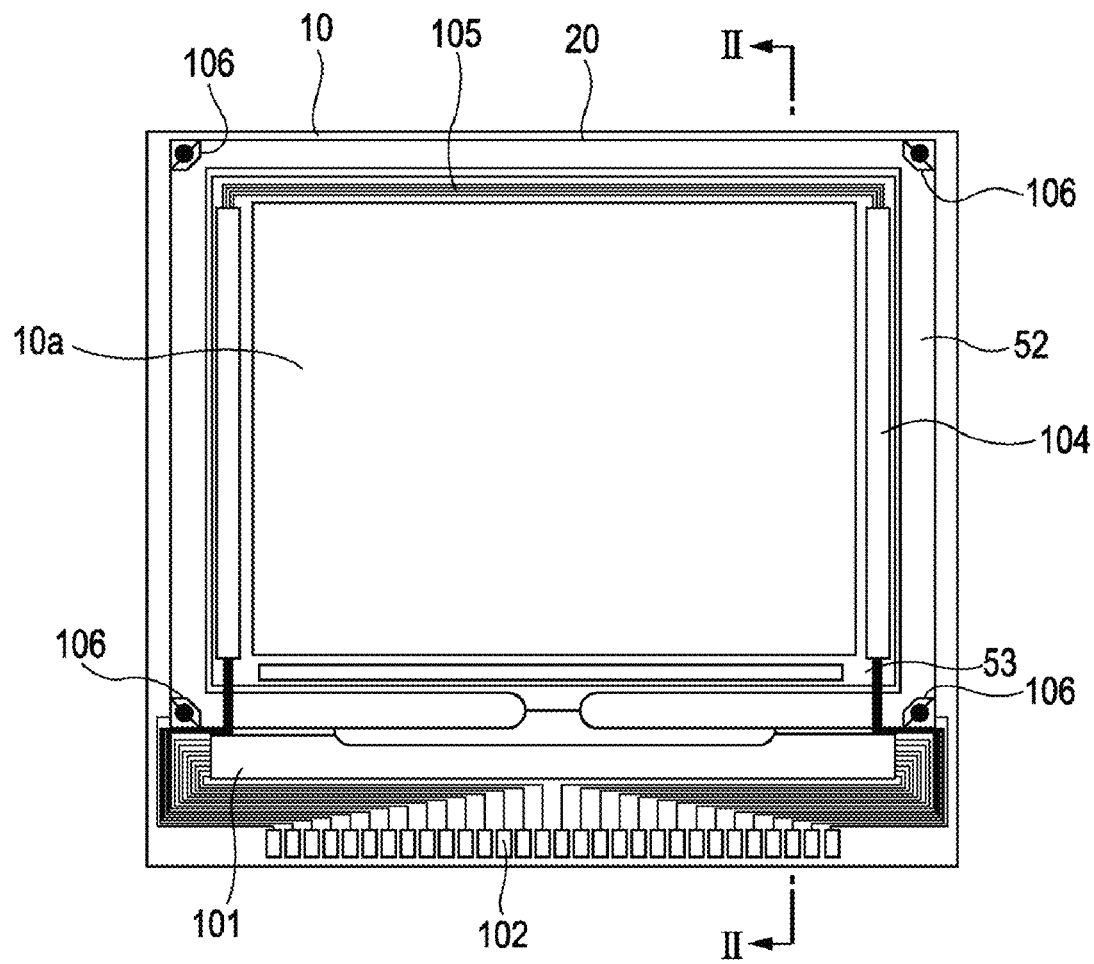
FIG. 1 is a plan view illustrating an overall configuration of an electro-optical apparatus according to an embodiment of the invention.
Figure 2:
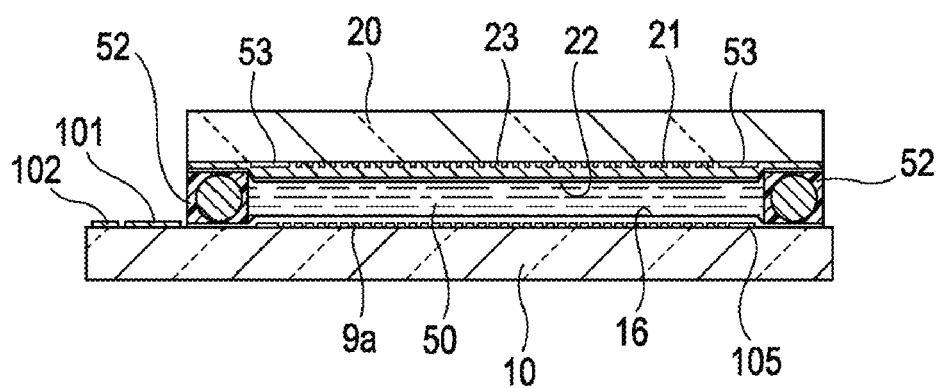
FIG. 2 is a cross-sectional view taken along the line II-II of FIG. 1.

Firstly, an overall configuration of the electro-optical apparatus according to an embodiment will be described with reference to FIGS. 1 and 2. Here, FIG. 1 is a plan view illustrating an overall configuration of an electro-optical apparatus according to the embodiment, and FIG. 2 is a cross-sectional view taken along the line II-II of FIG. 1. In addition, in FIGS. 1 and 2, for the sake of convenience of explanation, dummy electrodes and peripheral electrodes, which will be described below in detail, are omitted from illustration.

In FIGS. 1 and 2, in the electro-optical apparatus according to the embodiment, a TFT array substrate 10, which is an example of "a substrate" set forth in the invention, and an opposing substrate 20 are allocated so as to be opposite each other. The TFT array substrate 10 is, for example, a transparent substrate such as a quartz substrate or a glass substrate, a silicon substrate, or the like. The opposing substrate 20 is a transparent substrate, such as a quartz substrate or a glass substrate. Between the TFT array substrate 10 and the opposing substrate 20, a liquid crystal layer 50, which is an example of "an electro-optical material" set forth in the invention, is sealed. The liquid crystal layer 50 is composed of, for example, liquid crystal including one kind or several kinds of nematic liquid crystal molecules mixed therein and takes a prescribed alignment condition between a pair of alignment films which are attached to these substrates, respectively. The TFT array substrate 10 and the opposing substrate 20 are bonded to each other by a sealing material 52 provided in a sealing area located in an area surrounding an image displaying area 10a including a plurality of pixel electrodes therein. In addition, here, the image displaying area 10a is an example of "a pixel area" set forth in the invention.

The sealing material 52, which is used for bonding the two substrates and is composed of, for example, an ultraviolet curing resin, a thermosetting resin, or the like, is coated on the TFT array substrate 10, and subsequently, is made rigid by means of exposure to ultraviolet radiation, heating, or the like, during manufacturing processes. In the sealing material 52, a gap material, such as glass fibers or glass beads, is dispersed so as to make a distance between the TFT array substrate 10 and the opposing substrate 20 (i.e., a gap between substrates) be a prescribed constant value. In addition, the gap material may be allocated in the image displaying area 10a in addition to the gap material which is mixed in the sealing material 52, or in the area surrounding the image displaying area 10a as a substitute for the sealing material 52.

In parallel with and inside the sealing area where the sealing material 52 is allocated, a frame-shaped light-shielding film 53 having a light-shielding property, which defines a frame-shaped area of the image displaying area 10a, is provided on the opposing substrate 20 side. In addition, a portion or the whole of this frame-shaped light-shielding film 53 may be provided on the TFT array substrate side as an incorporated light-shielding film.

In an area located outside of the sealing area where the sealing material 52 is allocated, a data line driving circuit 101 and external circuit connection terminals 102 are provided along a side of the TFT array substrate 10. So as to be along two sides neighboring this side, and further, be covered by the frame-shaped light-shielding film 53, scanning line driving circuits 104 are provided. Moreover, in order to connect the two scanning line driving circuits 104 formed at both sides of the image displaying area 10a in such a manner as described above, a plurality of wiring lines 105 are provided so as to be along a remaining side of the TFT array substrate 10, and further, be covered by the frame-shaped light-shielding film 53.

In areas on the TFT array substrate 10, which are opposite four corner portions of the opposing substrate 20, vertical conduction terminals 106 are allocated so as to cause vertical conduction materials 107 to form connections between the both substrates. Such a configuration allows the TFT array substrate 10 and the opposing substrate 20 to be electrically conductive.

In FIG. 2, in the TFT array substrate 10, a laminated structure incorporating therein TFTs, which are driving elements and are used for switching of pixels, and wiring lines such as scanning lines, data lines and the like, is formed. The detailed structure of this laminated structure is omitted from illustration in FIG. 2, however, on this laminated structure, pixel electrodes 9a, each having an island shape, are formed in a prescribed pattern.

The pixel electrodes 9a are formed within the image displaying area 10a on the TFT array substrate 10 so as to be opposite the opposing electrodes 21. On the surface of the liquid crystal layer 50 side of the TFT array substrate 10, that is, on the pixel electrodes 9a, an alignment film 16 is formed so as to cover the pixel electrodes 9a.

On the surface of the opposing substrate 20, opposite the TFT array substrate 10, a light-shielding film 23 is formed. The light-shielding film 23 is formed, for example, so as to form a lattice-shaped pattern in plan view from the surface of the opposing substrate 20, opposite the TFT array substrate 10. In the opposing substrate 20, non-aperture areas are defined by the light-shielding film 23, and areas partitioned by the light-shielding film 23 are aperture areas, through which light rays emitted from, for example, a lamp for a projector, or a backlight for a direct view, are transmitted. The light-shielding film 23 may be formed in a stripe-shaped pattern, and non-aperture areas may be defined by the light-shielding film 23 and various kinds of elements, such as data lines, formed on the TFT array substrate 10 side.

On the light-shielding film 23, opposing electrodes 21 composed of a transparent material, such as ITO, are formed so as to be opposite the plurality of pixel electrodes 9a. Further, on the light-shielding film 23, in order to enable displaying of color images in the image displaying area 10a, color filters, which are omitted from illustration, may be formed in the aperture areas and areas each including a part of the non-aperture area. On the opposing electrodes 21, which are disposed on the surface of the opposing substrate 20, opposite the TFT array substrate 10, an alignment film 22 is formed.

In addition, on the TFT array substrate 10 shown in FIGS. 1 and 2, in addition to the data line driving circuit 101, the scanning line driving circuit 104 and the like, a sampling circuit configured to supply the data lines with signals resulting from sampling of image signals from image signal lines, further, a pre-charging circuit configured to supply a plurality of data lines with pre-charge signals, each having a prescribed voltage level, prior to supplying image signals, and an inspection circuit configured to inspect the quality, defects, and the like, of the electro-optical apparatus in process of manufacturing and before shipment thereof, may be formed.

Next, an electrical configuration of pixel sections of an electro-optical apparatus according to the embodiment will be described with reference to FIG. 3. Here, FIG. 3 is an equivalent circuit diagram illustrating individual elements, wiring lines and the like with respect to a plurality of pixel sections formed in a matrix shape, forming an image displaying area of an electro-optical apparatus according to the embodiment.

Figure 3:
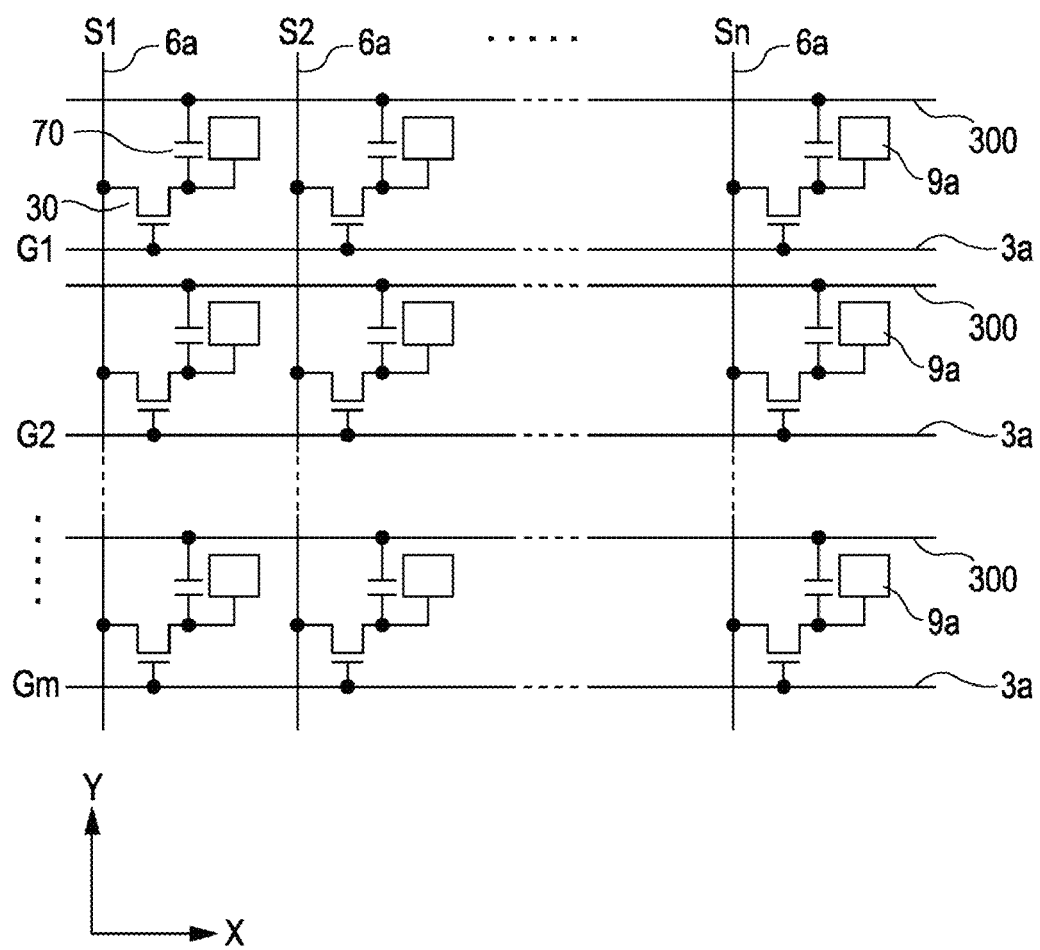
FIG. 3 is an equivalent circuit diagram illustrating individual elements, wiring lines and the like forming an image displaying area of an electro-optical apparatus according to an embodiment of the invention.

In FIG. 3, in each of the plurality of pixel sections formed in a matrix shape, forming the image displaying area 10a, a pixel electrode 9a and a TFT 30 are formed. The TFT 30 is electrically connected to the pixel electrode 9a, and performs switching control of the pixel electrode 9a during one of operations performed by the electro-optical apparatus according to the embodiment. Data lines 6a supplied with image signals are electrically connected to sources of the TFTs 30, respectively. Image signals S1, S2, . . . , Sn to be written into the data lines 6a may be line-sequentially supplied in this order, or to each of pluralities of data lines 6a located adjacent each other, the corresponding group of successive image signals may be supplied.

Scanning lines 3a are electrically connected to gates of the TFTs 30, respectively, and the electro-optical apparatus according to the embodiment is configured to line-sequentially apply pulse-shaped scanning signals G1, G2, Gm to the scanning lines 3a in this order at a prescribed timing. The pixel electrodes 9a are electrically connected to drains of the TFTs 30, respectively, and by causing the TFTs 30, which are switching elements, to be turned on for a constant period of time, the image signals S1, S2, . . . , Sn supplied from the data lines 6a are written at a prescribed timing. The image signals S1, S2, . . . , Sn, each having a prescribed level, are written into the liquid crystal, which is an example of an electro-optical material, via the pixel electrodes 9a, and are retained for a constant period of time between the pixel electrodes 9a and the opposing electrodes 21 formed on the opposing substrate 20.

In the liquid crystal forming the liquid crystal layer 50 (refer to FIG. 2), changes of alignments and regularities of molecular aggregates thereof in accordance with the levels of voltage applied thereto cause the liquid crystal to be light-modulated, and thus enable displaying of gradation images. For example, in the case where the electro-optical apparatus is operating in a normally white mode, transmission factors with respect to incident light rays are reduced in accordance with applied voltage levels for respective pixels, further, in the case where the electro-optical apparatus is operating in a normally black mode, transmission factors with respect to incident light rays are increased in accordance with applied voltage levels for respective pixels, and as a whole, light rays having contrasts in accordance with image signals are emitted from the electro-optical apparatus.

Here, in order to prevent leakage of retained image signals, storage capacitors 70 are added in parallel with liquid crystal capacitors formed between the pixel electrodes 9a and the opposing electrodes 21 (refer to FIG. 2). The storage capacitor 70 is a capacitor element functioning as a retaining capacitor configured to temporarily retain a voltage of the respective pixel electrode 9a in accordance with a supplied image signal. One of electrodes included in each of the storage capacitors 70 is connected to a drain of the TFT 30, and further, to the pixel electrode 9a, and the other one of the electrodes included in the storage capacitor 70 is connected to one of the capacitance lines 300 having a fixed voltage level, so as to be maintained a constant voltage. The storage capacitor 70 causes the voltage retaining characteristic of the pixel electrode 9a to be enhanced, and as a result, it is possible to achieve enhancement of the characteristics with which images are displayed, such as increasing of a contrast ratio and reducing of the probability of flickering.

In addition, only the pixel electrodes 9a formed in the image displaying area 10a have been described so far, and dummy pixel electrodes, which will be described below, are configured in approximately the same manner as the pixel electrodes 9a. Differences between the configuration of the pixel electrodes 9a and that of the dummy pixel electrodes will be described below in detail.

Next, configurations of a plurality of areas formed on the TFT array substrate 10 will be described with reference to FIGS. 4 and 5. Here, FIG. 4 is a schematic plan view illustrating a plurality of areas formed on the TFT array substrate 10, and FIG. 5 is a plan view illustrating configurations of pixel electrodes, dummy pixel electrodes and peripheral electrodes.

Figure 4:
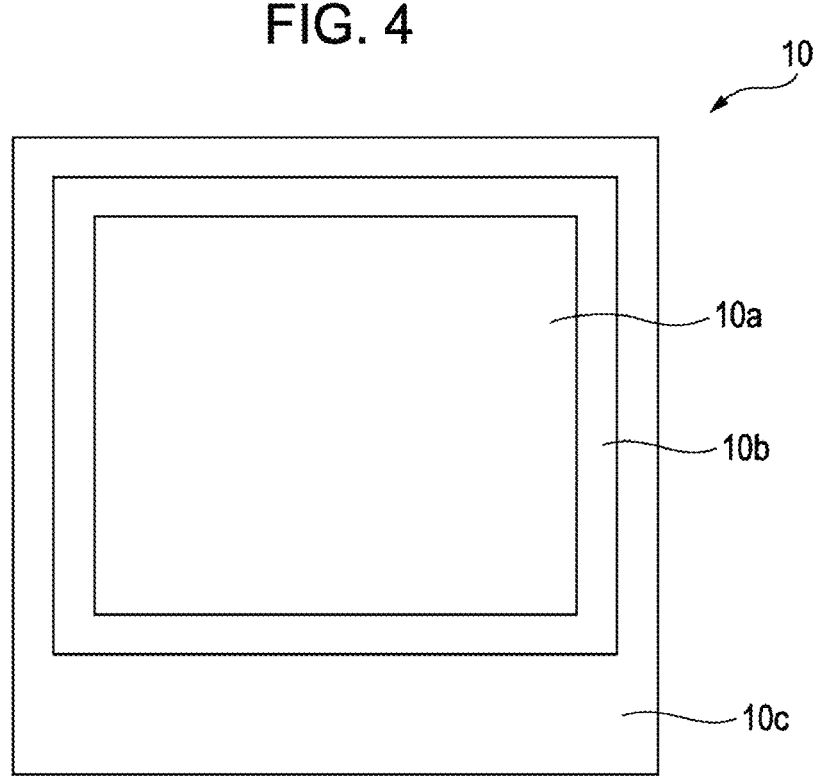
FIG. 4 is a schematic plan view illustrating a plurality of areas formed on a TFT array substrate 10.

In FIG. 4, the TFT array substrate 10 is divided into three areas, which are an image displaying area 10a, a dummy pixel area 10b and a peripheral area 10c. The image displaying area 10a is an area which contributes to displaying images by being irradiated by light rays, and concurrently, causing the pixel electrodes 9a included therein to be supplied with a voltage. Further, the dummy pixel area 10b is an area which is controlled in the same manner as or in a manner similar to the pixel area, but does not contribute to displaying images. The peripheral area 10c is an area which is formed outside of the image displaying area 10a and the dummy pixel area 10b, and includes peripheral circuits therein, such as the data line driving circuit 101 and the scanning line driving circuits 104 (refer to FIG. 1).

In addition, in FIG. 4, the dummy pixel area 10b is formed so as to enclose the whole of the image displaying area 10a, however, the dummy pixel area 10b may be formed so as to partially enclose the image displaying area 10a. That is, the dummy pixel area 10b may have portions which are not provided. In this respect, the peripheral area 10c may be configured in the same manner as or in a manner similar to the dummy pixel area 10b. Furthermore, in the TFT array substrate 10, areas not belonging to any of the image displaying area 10a, the dummy pixel area 10b and the peripheral area 10c, which were described above, may be formed.

Figure 5:
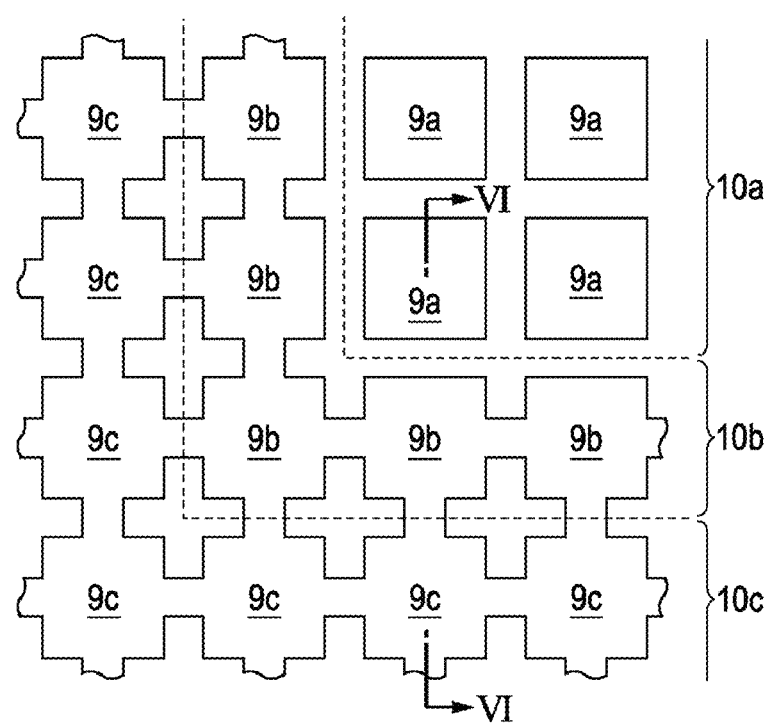
FIG. 5 is a plan view illustrating configurations of pixel electrodes, dummy pixel electrodes and peripheral electrodes.

In FIG. 5, in the image displaying area 10a, a plurality of pixel electrodes 9a are provided so as to each be located in a pixel section. In the dummy pixel area 10b, a plurality of dummy pixel electrodes 9b are provided so as to each be located in a dummy electrode section. Among the plurality of dummy electrodes 9b within the dummy pixel area 10b, those allocated so as to be adjacent each other are formed so as to be electrically connected to each other. In addition, in FIG. 5, a case in which the dummy electrodes 9b are disposed in a row and a column within the dummy pixel area 10b is shown, however, more dummy electrodes 9b (i.e., dummy electrodes 9b in two or more rows and two or more columns) may be allocated. In the peripheral area 10c, a plurality of peripheral electrodes 9c are provided. The peripheral electrodes 9c are formed, in the same manner as or in a manner similar to the dummy electrodes 9b, so that those allocated so as to be adjacent each other are formed so as to be electrically connected to each other. Further, dummy electrodes among the dummy electrodes 9b and peripheral electrodes among the peripheral electrodes 9c, each of the dummy electrodes and each of the peripheral electrodes being located adjacent each other, are mutually connected electrically.

Figure 6:
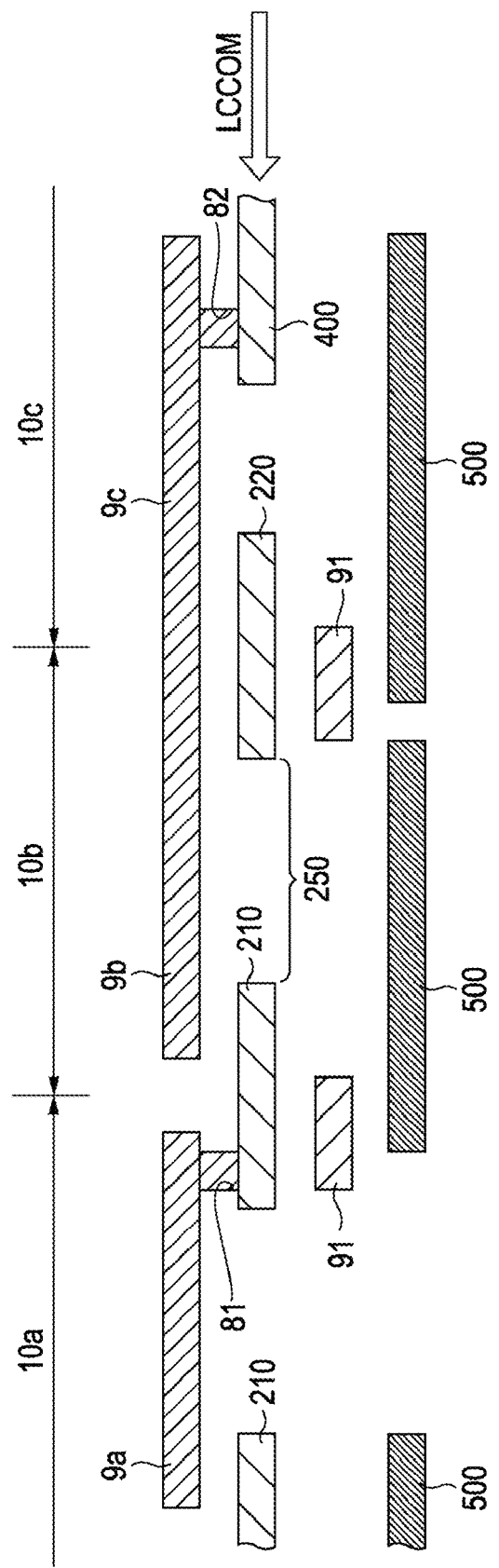
FIG. 6 is a cross-sectional view taken along the line VI-VI of FIG. 5.
Figure 7:
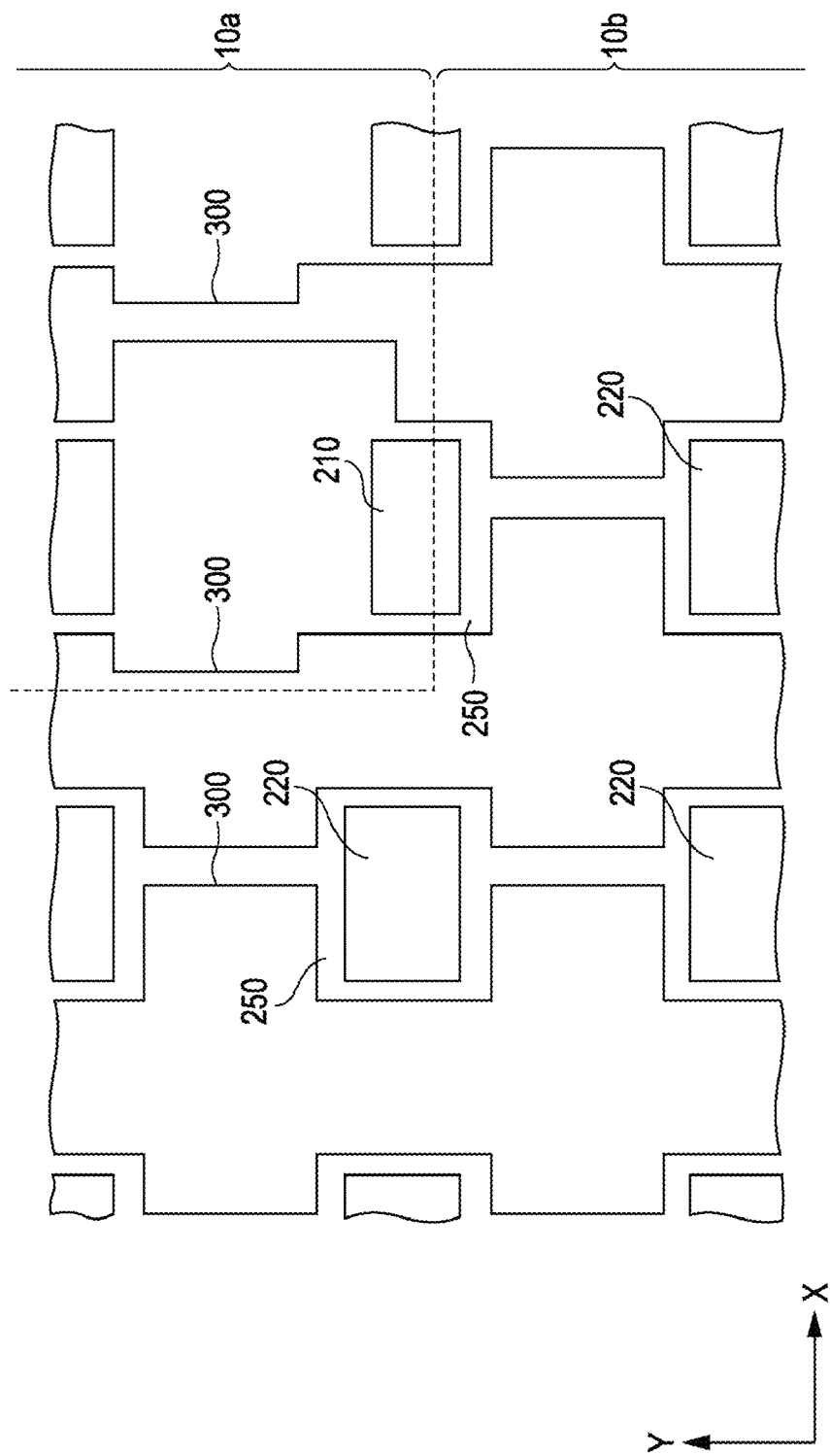
FIG. 7 is a plan view illustrating a configuration of a second layer of an electro-optical apparatus according to an embodiment of the invention.
Figure 8:
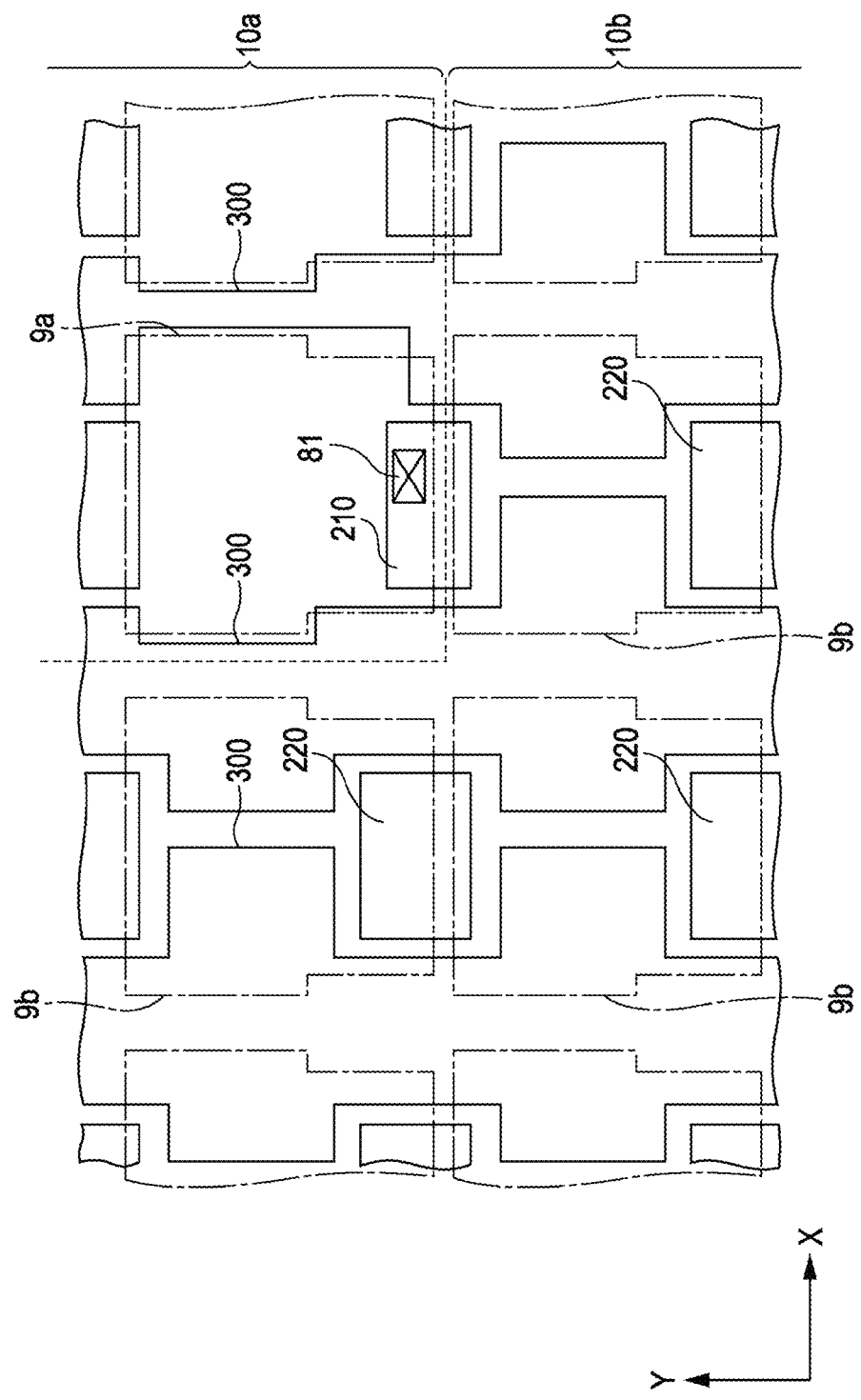
FIG. 8 is a perspective plan view illustrating a configuration of a first layer, in addition to a configuration of a second layer, of an electro-optical apparatus according to an embodiment of the invention.
Figure 9:
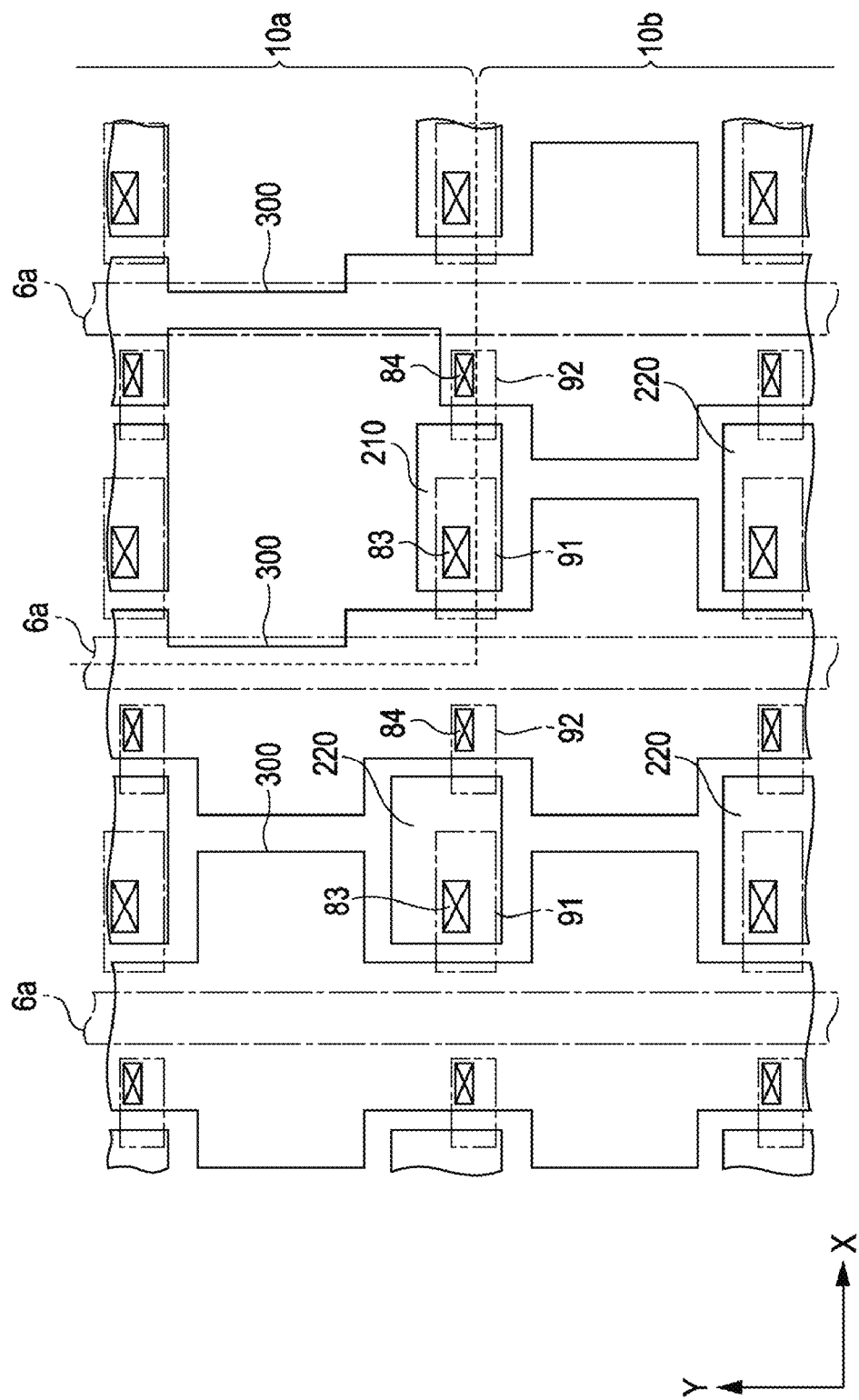
FIG. 9 is a perspective plan view illustrating a configuration of a third layer, in addition to a configuration of a second layer, of an electro-optical apparatus according to an embodiment of the invention.
Figure 10:
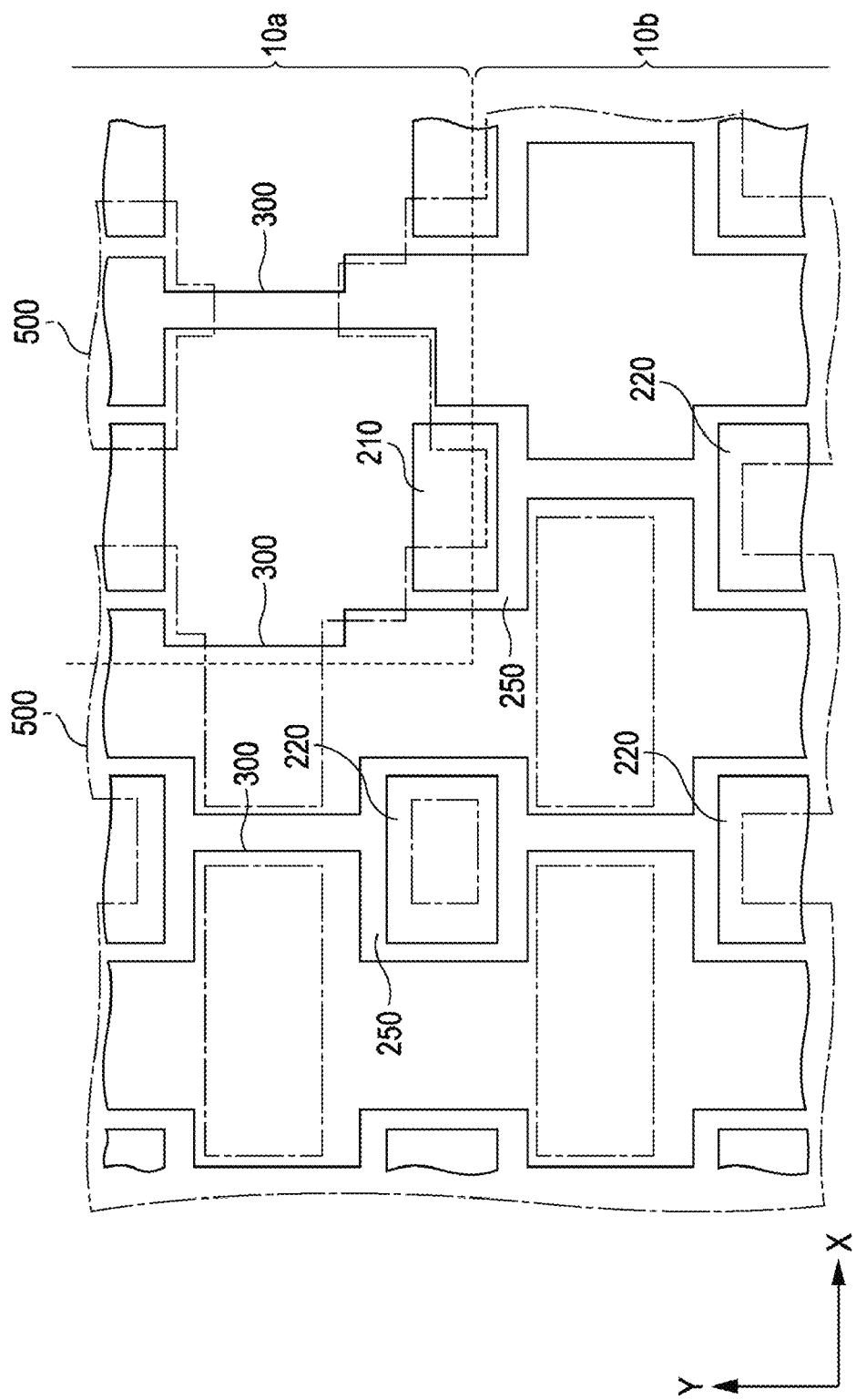
FIG. 10 is a perspective plan view illustrating a configuration of a fourth layer, in addition to a configuration of a second layer, of an electro-optical apparatus according to an embodiment of the invention.

Next, the above-described laminated structures in respective areas will be described in detail with respect to FIGS. 6 to 10. Here, FIG. 6 is a cross-sectional view taken along the line VI-VI of FIG. 5. Further, FIG. 7 is a plan view illustrating a configuration of a layer including first and second relay layers and the capacitance lines formed therein (which will be hereinafter termed "a second layer"), and FIG. 8 is a perspective plan view illustrating a configuration of a layer including the pixel electrodes, the dummy electrodes and the peripheral electrodes formed therein (which will be hereinafter termed "a first layer"), in addition to the configuration of the second layer. FIG. 9 is a perspective plan view illustrating a configuration of a layer including the data lines 6a and the like formed therein (which will be hereinafter termed "a third layer"), in addition to the configuration of the second layer, and FIG. 10 is a configuration of a layer including the light-shielding layer (which will be hereinafter termed "a fourth layer"), in addition to the configuration of the second layer. In addition, in FIG. 6, for the sake of convenience of explanation, elements which are formed on the upper side of the pixel electrodes and on the lower side of the light-shielding layer, and further, inter-layer insulating films which are formed between respective conductive layers, are omitted from illustration.

In FIG. 6, in the TFT array substrate 10 included in the electro-optical apparatus according to the embodiment, a plurality of conductive layers are laminated. Hereinafter, respective conductive layers formed in the TFT array substrate 10 will be sequentially described from the upper layer side (i.e., from an upper layer out of layers shown in FIG. 6)

In the TFT array substrate 10, as described with reference to FIG. 5, the first layer, which is located so as to be opposite the crystal layer 50 via an alignment film, is configured to include the pixel electrodes 9a formed in the image displaying area 10a, the dummy pixel electrodes 9b formed in the dummy pixel area 10b, and the peripheral electrodes 9c formed in the peripheral area 10c. The dummy pixel electrodes 9b and the peripheral electrodes 9c are composed of a transparent material, such as indium tin oxide (ITO).

The second layer, which is provided at the lower side than the first layer via the inter-layer insulating film, is configured to include a first relay layer 210, a second relay layer 220 and a voltage relay layer 400, which are examples of "relay layers" set forth in the invention. Each of elements included in the second layer is composed of, for example, an opaque metallic film including a metal such as aluminum, silver or the like, or an alloy of aluminum, silver or the like, and further, functions as an upper light-shielding film (an incorporated light-shielding film) configured to shield the TFT 30 from light rays. Further, the second layer may be composed of a material such as a simple metal, an alloy of metals, a metal silicide or a polysilicide, which includes at least one from among high melting point metals such as Ti, Cr, W, Ta, Mo and Pd, or alternatively, a laminated material including the above-described materials, or the like. In this case, a function as the incorporated light-shielding film can be enhanced.

Here, in the electro-optical apparatus according to the embodiment, particularly, a voltage LCCOM supplied to the opposing electrodes 21 (refer to FIG. 2) is supplied to the voltage relay layers 400. Each of the voltage relay layers 400 is electrically connected to one of the peripheral electrodes 9c via a contact hole 82. Therefore, the voltage LCCOM supplied to the voltage relay layer 400 is supplied to the peripheral electrode 9c. The peripheral electrode 9c is electrically connected to another peripheral electrode 9c arranged adjacent thereto, and as a result, the voltages of all of the peripheral electrodes 9c are made to be of a level substantially the same as that of the voltage LCCOM.

Further, the peripheral electrode 9c is electrically connected to one of the dummy pixel electrodes 9b provided within the dummy pixel area 10b. Therefore, the voltage LCCOM, which is supplied to the peripheral electrode 9c, is also supplied to one of the dummy pixel electrodes 9b. In the same manner as or in a manner similar to the peripheral electrodes 9c, the dummy electrode 9b is electrically connected another dummy electrode 9b arranged adjacent thereto, and as a result, the voltages of all of the dummy electrodes 9b are made to be of a level substantially the same as that of the voltage LCCOM.

As a result of the configuration provided above, the voltages of the dummy pixel electrodes 9b and the voltages of the peripheral electrodes 9c are of a level substantially the same as that of the voltages of the opposing electrodes 21 (i.e., the voltage LCCOM) formed on the opposing substrate 20. This configuration causes the dummy pixel area 10b including the dummy pixel electrodes 9b therein and the peripheral area 10c including the peripheral electrodes 9c therein not to generate direct currents flowing into the liquid crystal layer 50, thus, enables effective prevention of deterioration of the liquid crystal layer 50, and as a result, enables increase of reliability of the apparatus.

In addition, within the dummy pixel area 10b, as described above, no voltage is applied to the liquid crystal layer 50, however, a driving operation is performed by one of dummy TFTs (i.e., transistors simulating the TFTs 30, provided in the dummy pixel area 10b) in the same manner as or in a manner similar to one of the TFTs 30 within the image displaying area 10a. Therefore, making pixels which are unlikely to achieve stable displaying images to be dummy pixels certainly brings out an advantage which allows displaying images performed by the pixels allocated in the image displaying area 10a to be more stable.

In FIG. 7, at the second layer, the capacitance lines 300 are further formed at a distance from the first relay layers 210 and the second relay layers 220 via apertures 250, respectively. That is, the capacitance lines 300 are formed so as to enclose the first relay layers 210 and the second relay layers 220, respectively, each of the first relay layers 210 and the second relay layers 220 being formed in an island shape, and further, in order to cause the first relay layers 210, the second relay layer 220 and the capacitance lines 300 not to be electrically connected to one another, the apertures 250 are formed. In addition, the capacitance lines 300 within the image displaying area 10a are configured in a manner different from that for the capacitance lines 300 within the dummy pixel area 10b, in order not to reduce an aperture ratio of the image displaying area 10a.

Each of the capacitance lines 300 is a fixed-voltage-level side capacitor electrode, which is electrically connected to a constant voltage source and is maintained to be a fixed voltage level, further, is allocated so as to be opposite the other capacitor electrode via a dielectric film which is composed of, for example, a silicon (SiO2) film such as a high temperature oxide (HTO) film or a low temperature oxide (LTO) film, or a silicon nitride (SiN) film, and thereby, form one of the storage capacitors 70 (refer to FIG. 3).

As shown in FIG. 6 and FIG. 8, between the first layer and the second layer, the pixel electrode 9a within the image displaying area 10a and a first relay electrode 210 are electrically connected to each other via a contact hole 81. Further, the first relay electrode 210 is electrically connected to the TFT 30 at the lower layer side. Therefore, image signals supplied from one of the data lines 6a are supplied to the pixel electrode 9a via the relay electrode 210.

In contrast, the second relay electrode 220 within the dummy pixel area 10b is not electrically connected to the dummy pixel electrode 9b. That is, image signals supplied to the second relay layer 220 via the dummy transistor are not supplied to the dummy pixel electrode 9b. Therefore, it is possible to certainly cause the voltages of the dummy pixel electrodes 9b to be of a value substantially the same as that of the voltage LCCOM.

In FIGS. 6 and 9, the third layer, which is provided at the lower side than the second layer, is configured to include data lines 6a, third replay layers 91 and third relay layers 92. With respect to the third layer, differing from the case of the above-described second layer, the configuration thereof within the image displaying area 10a is approximately the same as that within the dummy pixel area 10b.

The data line 6a is composed of, for example, a material including aluminum (Al) such as Al—Si—Cu or Al—Cu, a simple Al material, or a multi-layer film composed of an Al layer, a TiN layer or the like. The data line 6a is electrically connected to the TFT 30, and supplies the TFT 30 with image signals for displaying images. Further, the data line 6a has also a function of shielding the TFT 30 from light rays.

Each of the third relay layer 91 is electrically connected to the first relay layer 210 or the second relay layer 220 via a contact hole 83. The third relay layer 91 is electrically connected to the TFT 30 at the lower layer side, and has a function of relaying image signals to the first relay layer 210 or the second relay layer 220.

Each of the third relay layers 92 is electrically connected to one of the capacitance lines 300 via a contact hole 84. The third relay layer 92 is electrically connected to one of light-shielding layers, which will be described below, and thereby, allows the light-shielding layer to function as a capacitance line.

In FIGS. 6 and 10, the third layer, which is provided at the lower layer side than the second layer via an inter-layer insulating film, is formed as a light-shielding layer 500. The light-shielding layer 500 is composed of, for example, a metallic film including a light-shielding effect, such as an aluminum, and is configured to shield the TFTs 30 within the image displaying area 10a and the dummy TFTs within the dummy pixel area 10b from incident light rays.

Here, in particular, the light-shielding layer 500 is formed so as to cover the apertures 250 (i.e., spaces between any two kinds out of three kinds of the first relay layer 210, the second relay layer 220 and the capacitance line 300). That is, the light-shielding layer 500 is configured to certainly shield the aperture 250 from light rays propagating towards the aperture 250. Therefore, such a configuration reduces the probability of occurrence of leakage currents in the TFTs 30 and the like, and enables effective prevention of occurrence of defects in operations of the apparatus.

As described above, in the electro-optical apparatus according to the embodiment, the configuration which enables prevention of occurrence of direct currents flowing between the opposing electrodes 21 and the dummy pixel electrodes 9b enables increase of reliability of the apparatus significantly effectively. Further, it is possible to prevent occurrence of leakage current due to incident light rays into the TFTs 30 and the like via the apertures 250. Therefore, it is possible to prevent occurrence of defects in the apparatus due to the leakage current.

Electronic Devices

Figure 11:
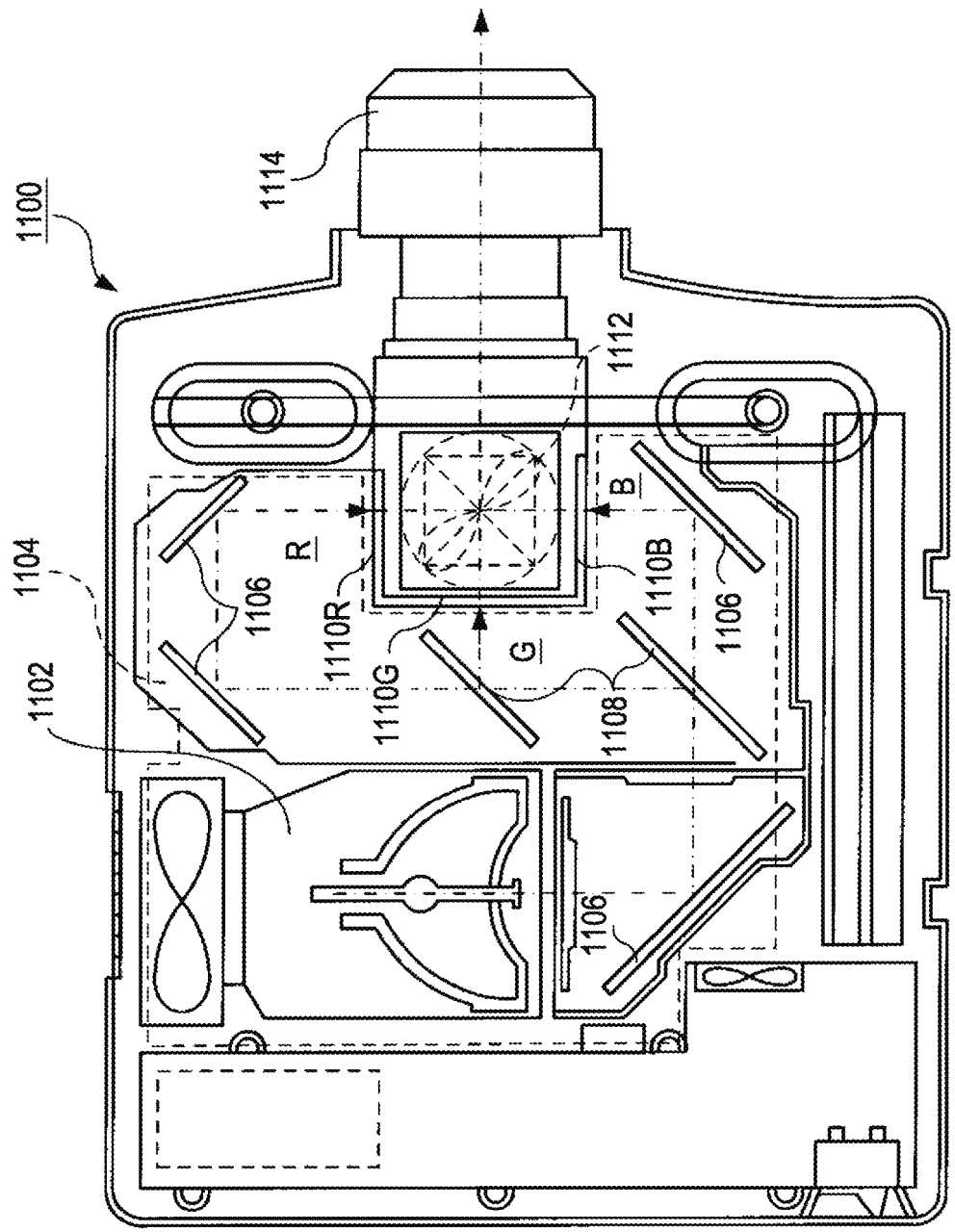
FIG. 11 is a plan view illustrating a configuration of a projector which is an example of an electronic device to which an electro-optical apparatus according to the invention is applied.

Next, an embodiment in which a liquid crystal apparatus, which is one of the electro-optical apparatus described above, is applied to various kinds of electronic devices will be described. Here, FIG. 11 is a plan view illustrating an example of a configuration of a projector. Hereinafter, a projector in which the liquid crystal apparatus is used as a light valve will be described.

As shown in FIG. 11, a lamp unit 1102 including a white color light source, such as a halogen lamp, is provided inside a projector 1100. Projection light rays irradiated from this lamp unit 1102 are separated to three light rays having three primary colors of RGB, respectively, by four mirrors 1106 and two dichroic mirrors 1108 located inside a light guide 1104, and the three light rays are inputted to liquid crystal panels 1110R, 1110B, and 1110G, respectively, each operating as a light valve corresponding to one of the three primary colors.

Each of the liquid crystal panels 1110R, 1110B and 1110G is configured in the same manner as or in a manner similar to that for the liquid crystal apparatus described above, and is driven by one of the primary colors of R, G and B supplied from an image signal processing circuit. Further, light rays modulated by these liquid crystal panels are inputted to a dichroic prism 1112 from three directions. In this dichroic prism 1112, each of light rays of R and B is refracted with an angle of 90 degrees, and in contrast, a light ray of G proceeds straight. Further, as a result of combination of images in respective colors, color images are projected on a screen or the like via a projection lens 1114.

Here, focusing attention on respective displaying images displayed by the liquid crystal display panels 1110R, 1110B and 1110G, images displayed by the liquid crystal display panel G are required to be left-right reversed relative to images displayed by the liquid crystal display panels 1110R and 1110B.

In addition, since light rays corresponding to respective primary colors are inputted to the corresponding liquid crystal panels 1110R, 1110R and 1110B by the dichroic mirrors 1108, it is unnecessary to provide color filters.

In addition, as electronic devices other than the electronic device described with reference to FIG. 11, a mobile type personal computer, a mobile phone and a liquid crystal TV, further, a view finder type or monitor direct view type video tape recorder, a car navigation device, a pager, an electronic notebook, an electric calculator, a word processor, a work station, a video telephone, a POS terminal and a device incorporating a touch panel can be suggested. Further, it is needless to say that the invention can be applied to these various kinds of electronic devices.

Furthermore, the invention can be applied to display apparatuses other than the liquid crystal display apparatus described above in respective embodiments, such as a reflection type liquid crystal apparatus (LCOS), a plasma display (PDP), a field emission type display (FED, SED) an organic EL display, a digital micro mirror device (DMD) and an electrophoretic device.

The invention is not limited to the above-described embodiments, but is appropriately changeable within the scope not apart from essences and ideas perceived from the scope of claims and the whole of the patent specification, and any electro-optical apparatus including such a change and any electronic device including the electro-optical apparatus are included in the technical scope of the invention.

What is claimed is:

1. An electro-optical apparatus comprising:
    a substrate;
    an opposing substrate opposed to the substrate;
    a pixel section configured to be formed in a pixel area on the substrate, the pixel section including a pixel electrode and a transistor corresponding to the pixel electrode;
    a dummy pixel section configured to be formed in an area surrounding the pixel area, the dummy pixel section including a dummy pixel electrode and a dummy transistor corresponding to the dummy pixel electrode;
    a peripheral electrode configured to be formed in an area surrounding the dummy pixel section, the peripheral electrode being at least partially connected electrically to the dummy pixel electrode;
    an opposing electrode configured to be opposite the pixel electrode; and
    a voltage supplying section configured to supply the opposing electrode and the peripheral electrode with voltages of substantially the same level, respectively.

2. The electro-optical apparatus according to claim 1, wherein the dummy pixel electrode is electrically connected to another dummy pixel electrode arranged adjacent thereto.

3. The electro-optical apparatus according to claim 1, wherein the dummy pixel electrode is formed so as not to be electrically connected to the dummy transistor.

4. The electro-optical apparatus according to claim 1, wherein patterning of the peripheral electrode is performed in a shape the same as that of at least one of the pixel electrode and the dummy pixel electrode.

5. The electro-optical apparatus according to claim 4, wherein the peripheral electrode is electrically connected to another peripheral electrode arranged adjacent thereto.

6. The electro-optical apparatus according to claim 1, further comprising:
    a relay layer having an island shape configured to form an electric connection between the pixel electrode and the transistor; and
    a capacitance line configured to be formed at a layer the same as that at which the relay layer is formed, and be formed so as to at least partially enclose the relay layer via an aperture occupying an area surrounding the relay layer.

7. The electro-optical apparatus according to claim 6, further comprising:
    a light-shielding layer configured to be formed at a layer located lower than that at which the relay layer and the capacitance line are formed, and be formed so as to at least partially cover the aperture in plan view from above the substrate.

8. The electro-optical apparatus according to claim 7, wherein the light-shielding layer is electrically connected to the capacitance line.

9. The electro-optical apparatus according to claim 6, further comprising:
    a voltage relay layer configured to be formed at a layer the same as that at which the relay layer and the capacitance line are formed,
    wherein the voltage supplying section supplies the peripheral electrode with a voltage via the voltage relay layer.

10. An electronic device comprising the electro-optical apparatus set forth in claim 1.

* * * * *